United States Patent [19]
Baxter et al.

[11] 3,861,716
[45] Jan. 21, 1975

[54] PLATFORM LIFT TRANSPORTER

[75] Inventors: Bobby G. Baxter, Warrenton; Earl W. Schmitt, Wright City, both of Mo.

[73] Assignee: The Binkley Company, Warrenton, Mo.

[22] Filed: Apr. 30, 1973

[21] Appl. No.: 355,980

[52] U.S. Cl. .......... 280/423 R, 280/34 A, 280/81 R
[51] Int. Cl. ............................................. B62d 53/06
[58] Field of Search ............ 280/81 R, 80 B, 124 F, 280/34 T, 6 H, 6.1, 6.11, 423 R, 425 A, 280/425 R, 34 R, 34 A

[56] References Cited
UNITED STATES PATENTS

| | | | |
|---|---|---|---|
| 2,165,617 | 7/1939 | Paes et al. | 280/6 H X |
| 2,196,338 | 4/1940 | McDaniel | 280/80 B |
| 2,630,329 | 3/1953 | Ryan | 280/34 A X |
| 2,743,936 | 5/1956 | Bigge | 280/34 A |
| 3,001,796 | 9/1961 | Martin | 280/124 F X |
| 3,278,199 | 10/1966 | Johnson | 280/423 R |
| 3,521,773 | 7/1970 | Geister | 280/423 R UX |
| 3,527,476 | 9/1970 | Winckler | 280/425 R X |

*Primary Examiner*—Leo Friaglia
*Assistant Examiner*—R. Schrecengost
*Attorney, Agent, or Firm*—Rogers, Ezell & Eilers

[57] ABSTRACT

This invention relates to a transporter having an adjustable platform, the transporter comprising a platform, a wheel bogie, means for supporting the rear end of the platform on the wheel bogie wherein said supporting means further comprises means restricting movement of the platform relative to the bogie in the generally horizontal direction and allowing movement of the platform relative to the wheel bogie in the generally vertical direction, and means for connecting the platform to the bogie, said connecting means providing generally vertical adjustment of the platform relative to the bogie in a selected manner. Also included is a front section pivotally connected to the front of the platform for rotation about a transverse axis of the platform, means connected between the pivotal section and platform for adjusting the vertical height of the front end of the platform relative to the ground, and further comprising means for connecting the front section to a truck for towing the transporter.

17 Claims, 20 Drawing Figures

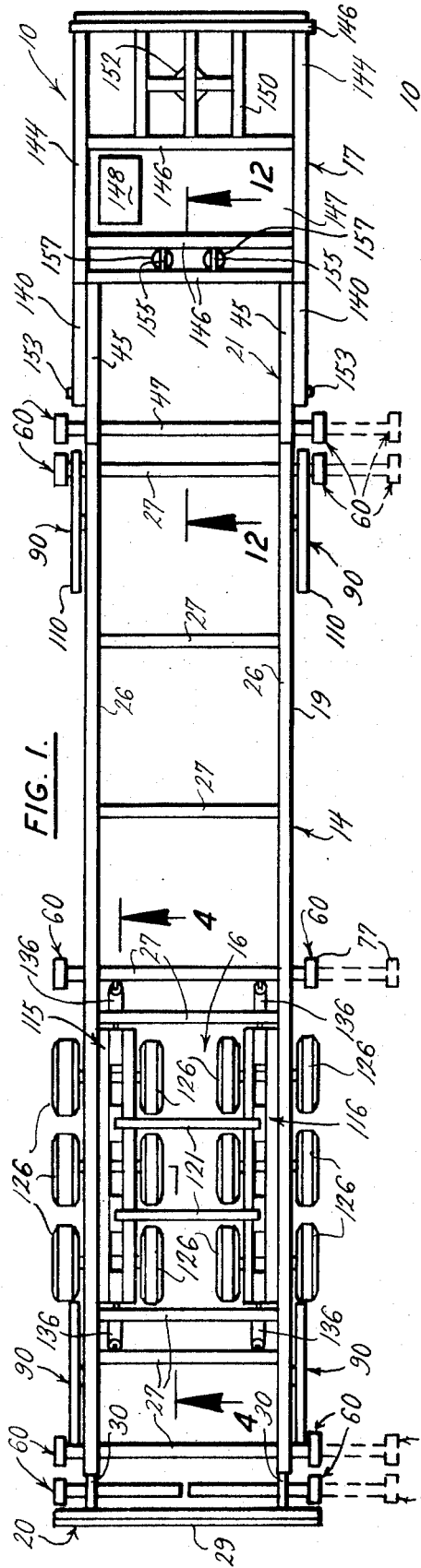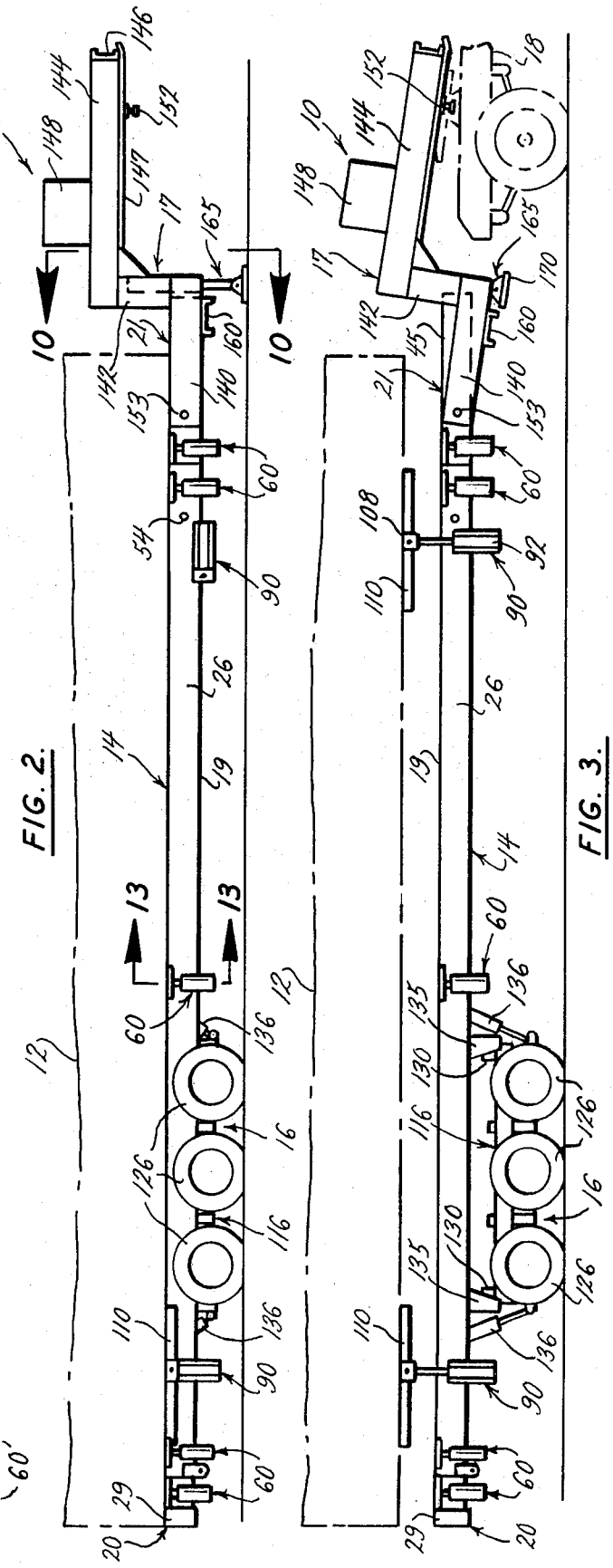

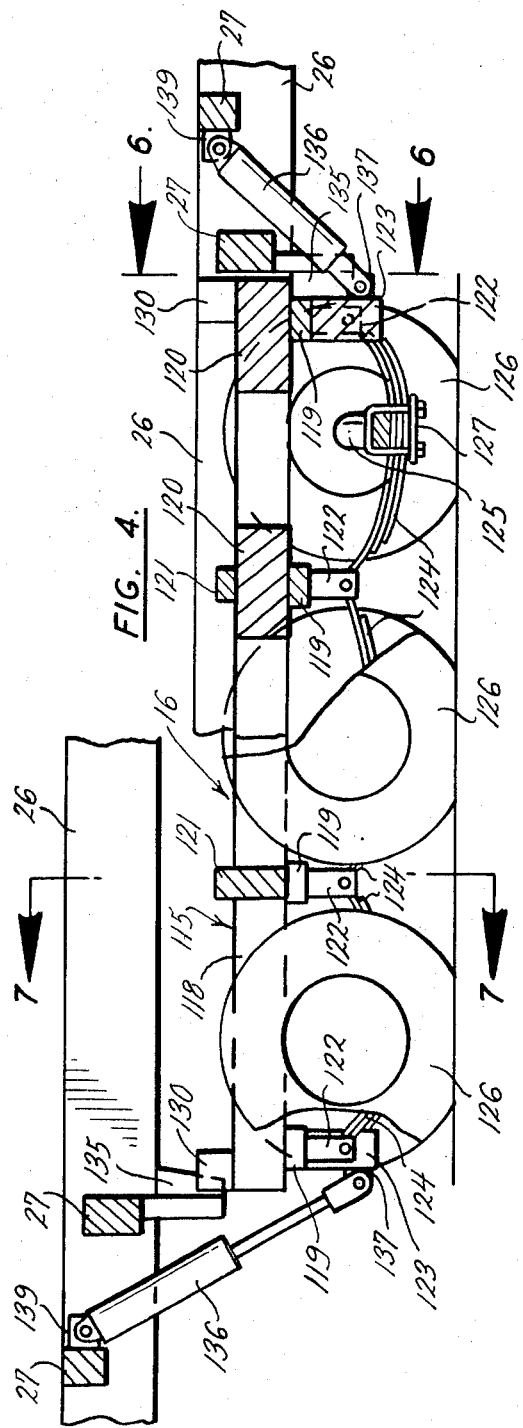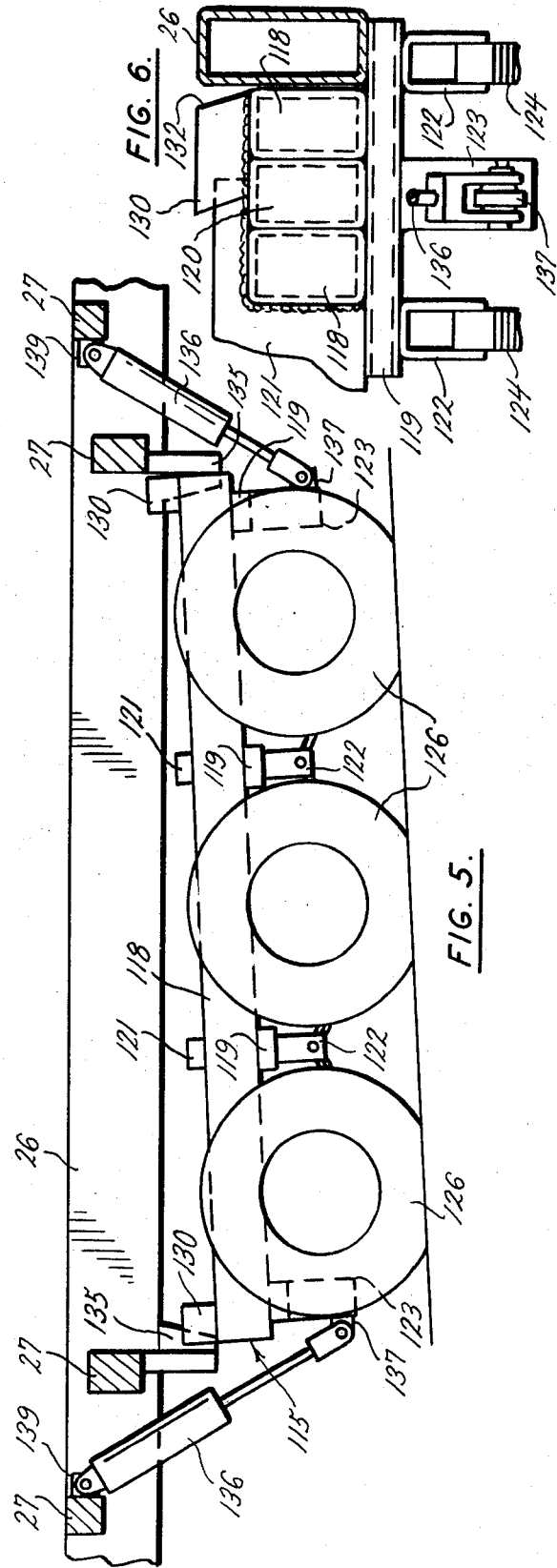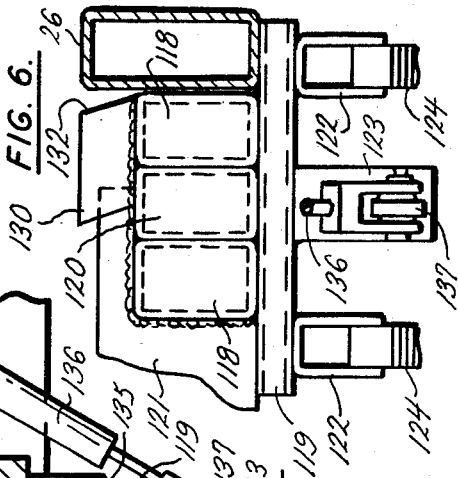

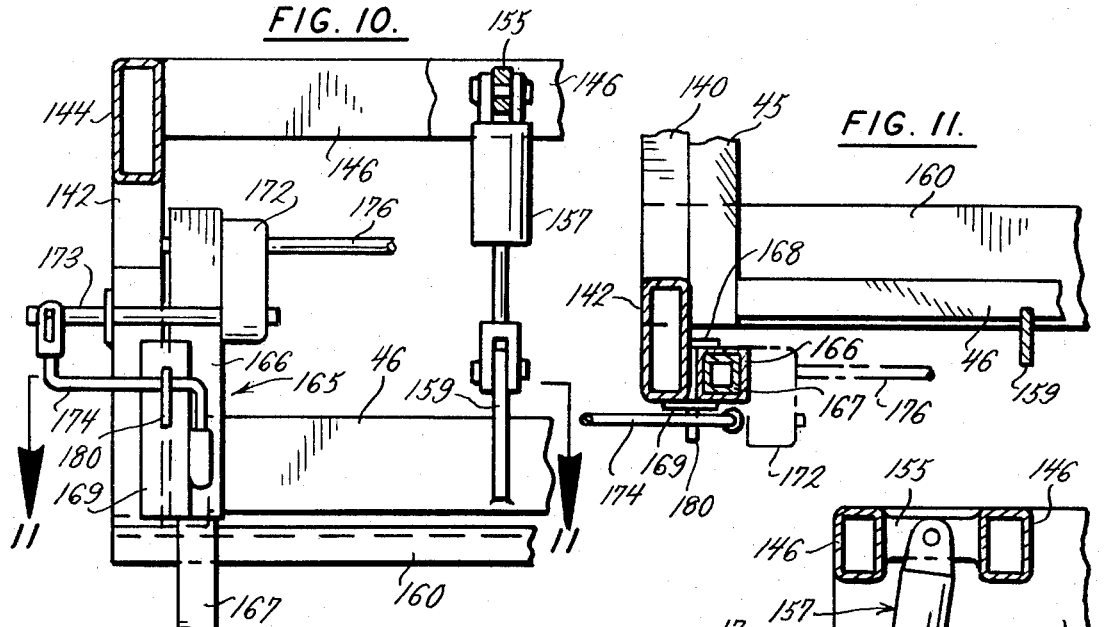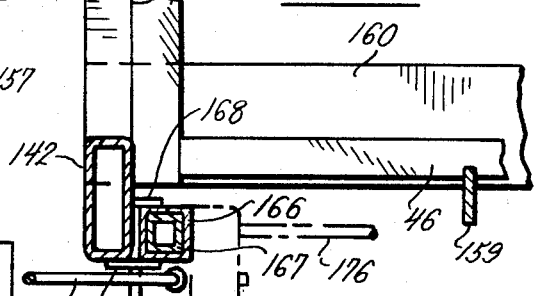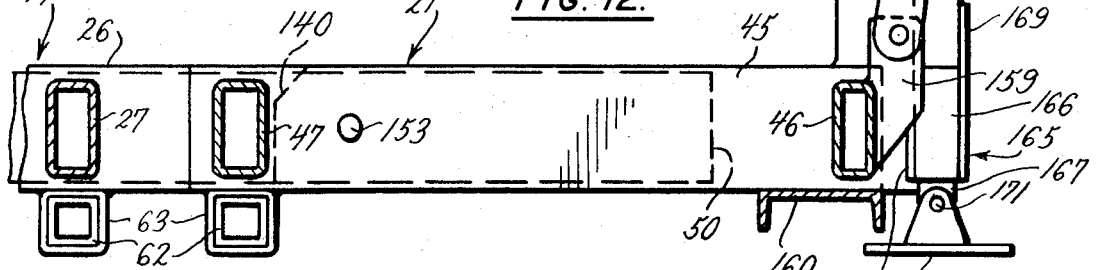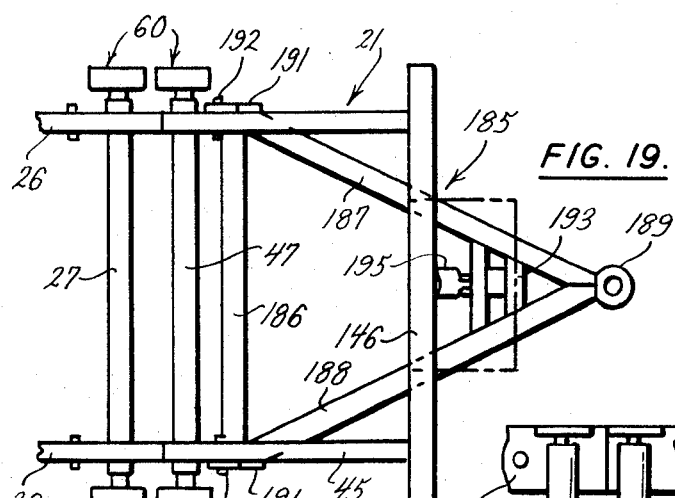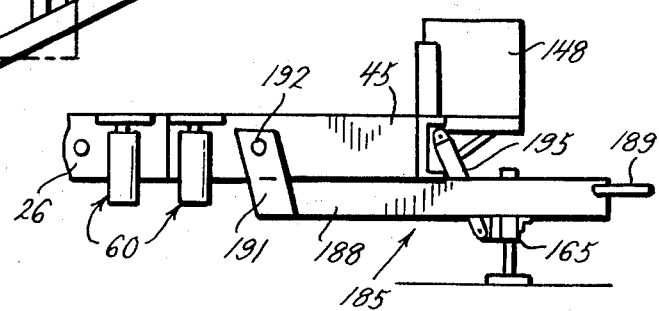

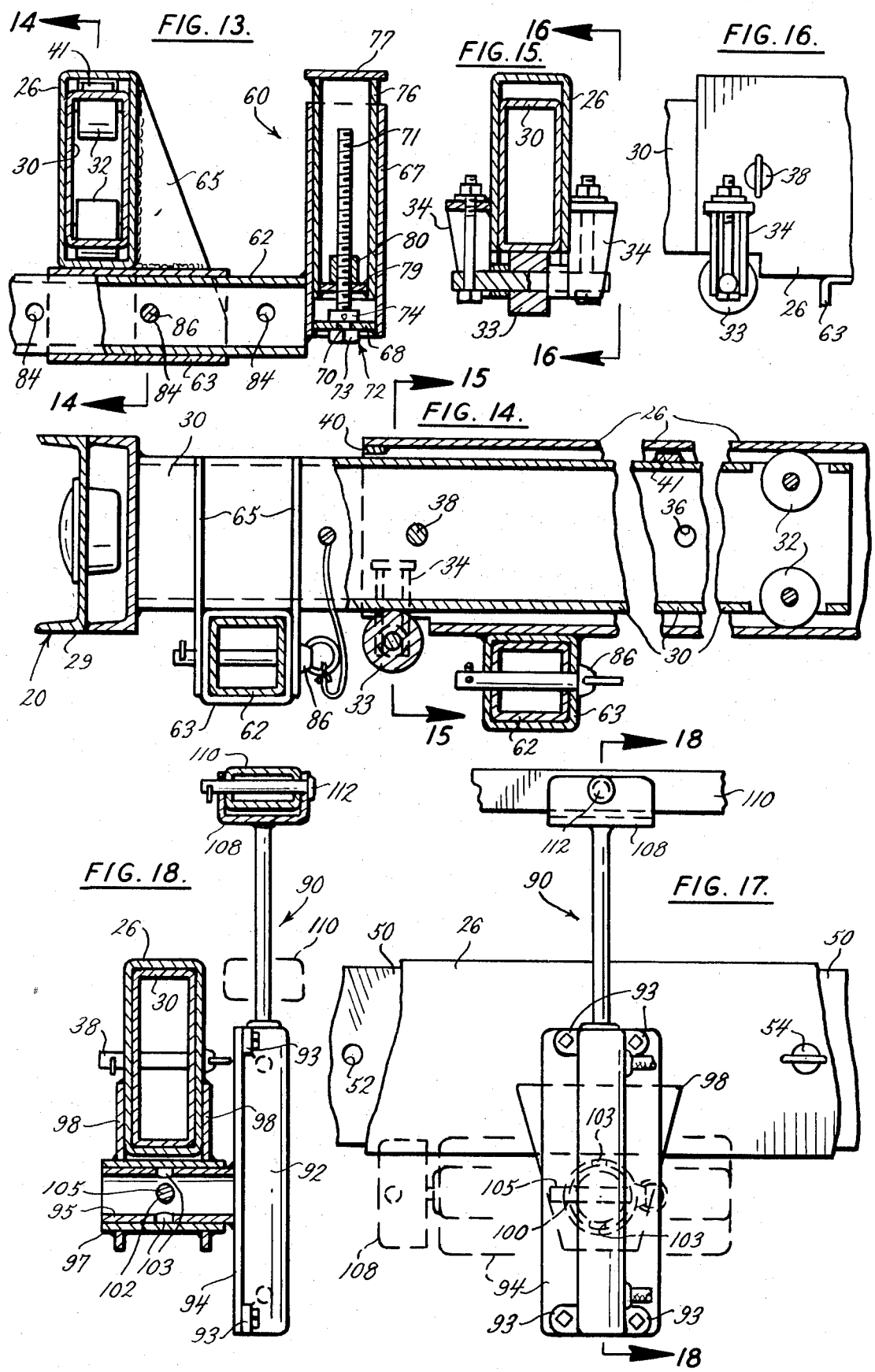

PLATFORM LIFT TRANSPORTER

SUMMARY OF THE INVENTION

This invention relates to transporters and specifically to transporters used for moving modular units such as modular homes from a manufacturing site to a foundation site whereupon the modules are transferred from the transporters onto the foundation.

Various types of transporters have been used for this purpose, but most are basically a fixed frame structure mounted by means of a suitable suspension system on wheel and axle assemblies. However, the moving, handling, and transferring of modular units create special problems that these old type transporters do not solve. One such problem is in loading the modules onto the transporter at the manufacturing site. Heretofore such loading has been by means of hoisting the module onto the transporter which can be awkward, time consuming, and require special hoisting equipment at the manufacturing site. Another problem occurs at the foundation site where the terrain near the foundation is uneven. The problem here is that the module must be moved from the transporter onto the foundation which is usually accomplished by means of tracks over which the module is moved. If the terrain near the foundation is uneven such that the transporter and module are not level, it makes it very difficult to correctly position the tracks and transfer the module. A third problem has occured with the prior art transporters in lifting the modules off the transporter platform for placement of apparatus such as tracks and the like therebetween for transferring the module.

Prior attempts to overcome these problems have been mostly on a case-by-case basis and usually with a great deal of aggravation and wasted manpower and effort. Hence, there has long been a need for an improved transporter that solves these problems and this invention provides such a transporter.

The transporter of this invention generally includes a platform on which a modular unit or the like is supported. The platform in turn is supported near its rear end on a bogie assembly which is connected to the platform by means of hydraulic cylinders Guide means are provided between the bogie assembly and platform to allow generally vertical movement of the platform relative to the bogie assembly and yet prevent excessive horizontal movement of the platform relative to the bogie assembly under varying load conditions. The front of the platform is connected to a pivotal section which may be in the form of a gooseneck or trailer hitch assembly or the like and which in turn, therefore, is adapted for connection to a truck used for towing the transporter. Hydraulic means are mounted between the front pivotal unit and the front end of the platform for raising or lowering of the front end of the platform. Various ones of these hydraulic cylinders are independently controlled to raise or lower either or both sides, the front end, or the rear end of the platform, or any combination of these, as desired within the limits of the cylinders.

Also provided as part of the platform are front and rear sections and side outriggers each of which are extensible to effectively enlarge the length and width of the platform as desired to accommodate modules of different sizes. Hydraulic jacks are attached to the transporter to lift the module off the transporter quickly and easily for the insertion of transfer apparatus therebetween. Jack stands are provided at the front of the transporter to support its front end where the truck is not used.

The transporter of this invention provides total height adjustability of the platform for ease in leveling the module at the site foundation or anywhere else as desired regardless of ground terrain. At the manufacturing site, the modules can be manufactured on stands between which the transporter can be driven and its platform raised to move the module quickly, easily and directly off the stand without the use of special hoisting equipment. The extensible platform accommodates modules of different sizes and the jacks make the insertion of tracks or other transfer equipment between the module and the platform nearly effortless.

Hence, it is a primary object of this invention to provide a transporter which greatly facilitates the loading, moving, and transferring of modules from a manufacturing site to and onto a foundation site, and to provide such a transporter with a platform that is adjustable in height for leveling regardless of ground terrain on which the transporter rests.

Other objects of the invention will become evident from the drawings and detailed description to follow.

DESCRIPTION OF THE DRAWINGS

FIG. 1 is a plan view of a platform lift transporter of this invention;

FIG. 2 is a side elevation view of FIG. 1 showing the transporter in its lowered position;

FIG. 3 is a view similar to FIG. 2 but showing the transporter in its raised position;

FIG. 4 is an enlarged view in section taken generally along the line 4—4 of FIG. 1, and broken to illustrate both the raised and lowered positions of the transporter;

FIG. 5 is a view similar to FIG. 4 but showing the transporter positioned uphill but with its platform level;

FIG. 6 is an enlarged view in section taken generally along the line 6—6 of FIG. 4;

FIG. 10 is an enlarged view in section taken generally along the line 10—10 of FIG. 2;

FIG. 11 is a view in section taken generally along the line 11—11 of FIG. 10;

FIG. 12 is an enlarged view in section taken generally along the line 12—12 of FIG. 1;

FIG. 13 is an enlarged view in section taken generally along the line 13—13 of FIG. 2;

FIG. 14 is a view in section taken generally along the line 14—14 of FIG. 13;

FIG. 15 is a view in section taken generally along the line 15—15 of FIG. 14;

FIG. 16 is a view in section taken generally along the line 16—16 of FIG. 15;

FIG. 17 is an enlarged view of the front jack portion of FIG. 3;

FIG. 18 is a view in section taken generally along the line 18—18 of FIG. 17;

FIG. 19 is a plan view showing another embodiment of the front section of a platform lift transporter of this invention; and FIG. 20 is a side elevation of FIG. 19.

DETAILED DESCRIPTION OF PREFERRED EMBODIMENTS

Figure 7:
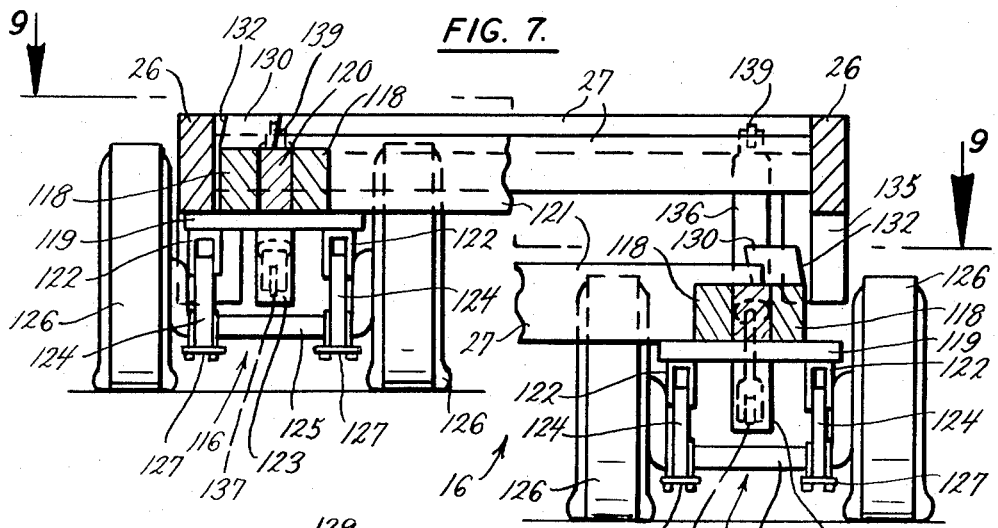
FIG. 7 is a view in section taken generally along the line 7—7 of FIG. 4, and broken to show the transporter in both its raised and lowered positions.

In the drawing there is shown the platform lift transporter 10 of this invention for supporting and transporting a modular unit 12 shown in dashed lines in FIGS. 2 and 3 such as a modular home or the like that is preassembled at an assembly plant and then transported to a foundation site by the transporter 10 for transfer and alignment onto a site foundation. The transporter 10 of this invention has a totally adjustable platform 14 supported at its rear end on a bogie assembly 16, and at its front end to a front pivotal frame section 17 which is pivotally mounted to the front end of the platform 14 in a manner to be described and is adapted for attachment to a truck 18, shown in dashed lines in FIG. 3, for pulling the transporter.

The platform 14 includes a central or main frame assembly 19, a rear telescoping frame assembly 20, and a front frame assembly 21. The main frame assembly 19 includes main side frame members 26 and reinforcing cross members 27 between the side members 26 and spaced along their length. Generally all of the frame members of the transporter are of rectangular tubular construction as shown in the various sectional views of the drawing.

The rear telescoping section 20 includes a rear frame member 29 and side members 30 extending therefrom and telescoping into the side members 26 of the main platform section 19 as best shown in FIGS. 1 and 13 through 16. The members 30 telescope within the members 26 a substantial distance to provide adjustability in the length of the transporter by moving the rear frame section 20 away from or toward the main frame section 19. Rollers 32 (FIG. 14) are mounted at the forward ends of the members 30 to roll on the inner surfaces of the upper and lower sides of the members 26, and rollers 33 are mounted by means of suitable brackets 34 to the rear ends of the members 26 to support the bottom sides of the members 30 thereon. The rollers 32 and 33 provide bearing means between the members 26 and 30 to facilitate easy telescoping of the rear section 20 relative to the main section 19.

The members 26 have a series of spaced apertures which may be axially aligned with suitable apertures 36 in the members 30 at various extended positions of the rear section 20 to receive a suitable locking pin 38 (FIG. 18). Stop plates 40 are secured to the inner surfaces of the members 26 near their rear ends, and stop plates 41 are secured to the outer surfaces of the members 30 a distance rearwardly from the rollers 32 such that with the rear section 20 fully extended, the stop plates 40 and 41 engage to prevent the rear assembly 20 from completely separating from the main section 19.

The front section 21 includes side members 45, a front member 46 (FIGS. 10 and 12) and a cross member 47 located near the rear end of the section 21. As seen in FIGS. 12 and 17, tubular members 50 fit within the side members 26 and 45 to join these members together in end to end relation. The members 50 have a series of spaced apertures 52 that may be axially aligned with an aperture in the side members 26 at various degrees of extension of the members 50 relative to the members 26 to receive a pin 54 therethrough for locking the members in a selected position. This adjustability at the forward end of the platform 14 coupled with the adjustability of the rear section 20 provides exceptionally great latitude in adjusting the overall length of the platform to accommodate modules of different sizes.

As best shown in FIGS. 1 through 3 and 13, a series of adjustable outriggers 60 extend outwardly from the side members 30, 26, and 45 of the platform 14 so as to be spaced along nearly the entire length of the platform. These outriggers are adjustable both outwardly as shown by the dashed lines of FIG. 1 and vertically in the manner to be described to accommodate modules of various widths and lower frame structure. Each outrigger assembly 60 comprises a tubular frame member 62 that slides within a tubular sleeve 63 mounted such as by welding to the underside of the frame members 30, 26, or 45 so that the sleeve members 63 are oriented generally normally to the side members 30, 26, and 45. Suitable reinforcing plates 65 are secured between the sleeve 63 and side members 30, 26, or 45 to add support to the sleeves 63 under the heavy loads of the modules. A vertical tubular sleeve member 67 is mounted at the outer end of the member 62, the lower end of the member 63 having a plate 68 secured therein. An aperture 70 is located in the center of the plate 68 to receive the shank 71 of a bolt 72. The bolt 72 has a hexagon shaped head 73 for turning with a suitable wrench and a retainer 74 on the side of the plate 68 opposite the head 73 for retaining the threaded shank 71 within the member 67. The aperture 70 in the plate 68 is sized sufficiently large to allow free turning of the bolt therein.

Another tubular member 76 with its top covered by a support plate 77 extends downwardly within the member 67. The lower end of the member 76 has a plate 79 mounted therein, the plate 79 having a suitable aperture axially aligned with the aperture 70 for receiving the shank 71 of the bolt. On the upper side of the plate 79 and axially aligned with the aperture therein is a threaded nut 80 for engaging the threaded shank 71.

A series of apertures 84 are spaced along the length of the member 62 and may be axially aligned with an aperture in the sleeve 63 for receiving a pin 86 for locking the outrigger assembly in a selected extended position. The vertical height of the support plate 77 is adjustable by turning the bolt 72.

On each side and located near the front and rear of the platform 14 are jacks 90. Each of the jacks 90 includes a hydraulic cylinder 92, the cylinder portion of which is mounted by means of suitable brackets 93 to a vertical plate 94 which in turn is mounted to the end of a tubular member 95 of circular cross section (FIGS. 17 and 18). The member 95 fits within a sleeve 97 of circular cross section which is mounted beneath the side members 26 by means of bracket plates 98. The sleeve member 97 has apertures 100 located on its diameter, and the member 95 has one set of apertures 102 on one diameter and another set of apertures 103 on another diameter at 90° to the first set. The apertures 100, 102, and 103 are located such that the cylinder of the jack can be placed in its use position (FIGS. 1, 17, and 18) with the cylinder generally vertical or in its stored position (FIG. 2) with the cylinder generally horizontal by simply rotating the cylinder 92 and tubular member 95 and then locking the cylinder in the selected position by means of a pin 105 inserted into the appropriate sets of aligned apertures.

On top of the piston shaft of the cylinder 92 is mounted a U-shaped bracket 108 for receiving a support bar 110 which is secured within the bracket 108 by means of a locking pin 112 inserted through appropriate apertures as best shown in FIG. 18. Suitable hydraulic lines (not shown) feed hydraulic fluid to the jacks 90 from a hydraulic power source.

Hence, the jacks 90 can be placed in the horizontal position for storing such as when a modular unit is on the transporter for transporting from a manufacturing site to a foundation site, or they may be placed in the use position with the support bar 110 locked in place to raise the modular unit off the platform. This is particularly useful for placing appropriate tracks and other apparatus between the transporter and module for movement of the module from the transporter onto the site foundation. After the tracks and other apparatus are in place, the jacks are lowered and the module is ready for transferring onto the site foundation.

The back end of the transporter 14 is supported on the bogie 16. Referring primarily to FIGS. 4 through 9, the bogie assembly 16 includes a left bogie section 115 and an identical right bogie section 116. Each bogie section includes parallel frame members 118 joined by cross members 119 spaced along the length of the members 118. The parallel members 118 are further supported in spaced relation by frame sections 120 positioned therebetween and spaced along their lengths. The bogie sections 115 and 116 are joined by cross members 121. A plurality of hanger brackets 122 depend from the underside and at each end of the cross members 119. In this described embodiment there are eight such hanger brackets 122 on each bogie section. A series of leaf springs 124 are connected between the hanger brackets in the manner best shown in FIG. 4, and the axles 125 of double wheel axle assemblies 126 are mounted by means of axle brackets 127 to the leaf springs. In this described embodiment, there are a total of six double wheel assemblies 126 although more or fewer such assemblies could be used depending on load requirements.

Figure 8:
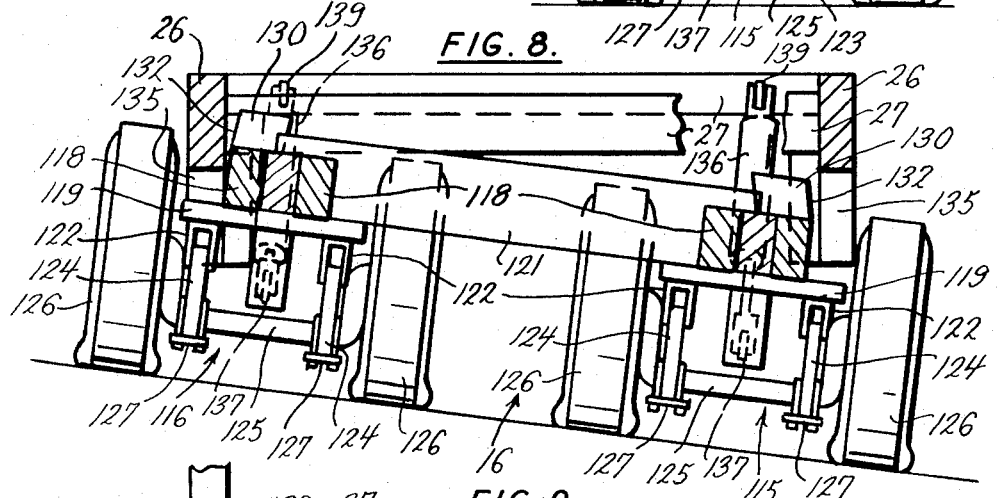
FIG. 8 is a view similar to FIG. 7 but showing the transporter positioned sideways on a hill but with its platform level.
Figure 9:
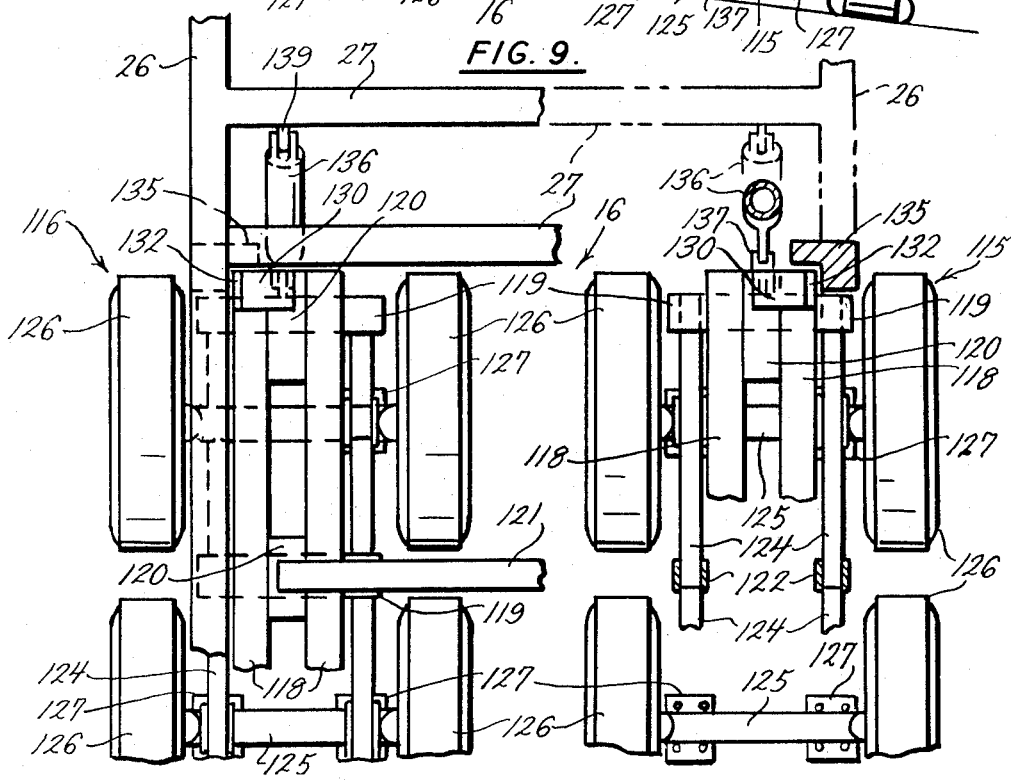
FIG. 9 is a view in section taken generally along the line 9—9 of FIG. 7.

At each of the four outer corners of the bogie assembly 16 is located a guide block 130 which is actually mounted on top and at the ends of the outside frame members 118. The guide block 130 has a side surface 132 that tapers inwardly toward the top as best shown in FIGS. 7 through 9. Spaced slightly from each of the guide blocks 130 is a guide rail 135, which is generally L-shaped and secured to the undersides of the frame members 26 and and cross members 27, between which the bogie assembly 16 is located. The spacing between the guide blocks 130 and guide members 135 is such as to limit the generally horizontal movement of the bogie assembly relative to the platform under varying load conditions to which the transporter is subjected, and yet sufficiently great to allow tilting of the platform relative to the bogie assembly about both the longitudinal and transverse axes of the platform. The tapered side surfaces 132 of the guide blocks 130 provide further clearance when tilting the platform about its longitudinal axis.

A hydraulic cylinder 136 (as best shown in FIGS. 4 and 5), located at each end of each bogie section, ties the platform 14 to the bogie assembly 16 with the piston ends of the cylinders 136 attached to suitable brackets 137 which in turn are secured to the end hanger brackets 123, and the cylinder ends secured by means of suitable brackets 139 to cross members 27. Hence, there are four hydraulic cylinders 136 attaching the platform 14 to the bogie assembly 16. Suitable hydraulic lines (not shown) supply hydraulic fulid to the cylinders from a hydraulic power source. By operation of various ones of the hydraulic cylinders 136, the platform 14 can be tilted in various ways as will be more clearly described.

As best shown in FIGS. 1 through 3 and 10 through 12, the front pivotal section 17 of the transporter 10 of this first described embodiment is of a gooseneck design having side arm members 140 to which at one end are connected vertical members 142 extending upwardly therefrom. Further arm members 144 extend forwardly from the upper ends of the vertical members 142, the gooseneck assembly 17 being reinforced by a series of cross support members 146. Between two of the cross members 146 is a floor 147 defining with the members 146 a compartment for holding a hydraulic power source illustrated at 148 and other assorted equipment. Attached between the front two of the cross members 146 is a frame structure 150 beneath which is supported a king pin 152 for connecting the transporter 10 to the fifth wheel of the truck 23.

The rear ends of the arms 140 are pivotally connected as at 153 to the members 45 of the front section 21 of the platform 14. The pivotal axis of the gooseneck section 17 is spaced rearwardly from the front ends of the members 45 and these front ends are located about at the place of the vertical members 142. Two of the cross members 146 are located at the top of the members 142 between the sides 144 with brackets 155 therebetween, each bracket supporting one end of a hydraulic cylinder 157. In this embodiment two such hydraulic cylinders are shown. The other ends of the hydraulic cylinders 157 are attached by means of brackets 159 to the cross member 46 of the front platform section 21.

With the platform 14 in its lowered position as shown in FIGS. 2 and 12, the cylinders 157 are extended. Retracting the cylinders 157 lifts the front end of the platform 14 and causes the gooseneck section 17 to pivot at 153 as shown in FIG. 3. A beam 160 is mounted under and spans between the arms 140 to limit the downward movement of the front end of the platform 14 to the lowered position shown in FIGS. 2 and 12 as the cylinders 157 are extended.

A pair of jack stands 165, one mounted at each side of the gooseneck section 17 just inside the upright members 142, are for supporting the front end of the transporter without the truck 23. Each jack stand 165 includes an outer tubular member 166 and an inner tubular member 167 that slides vertically within the member 166. The member 166 is mounted near the inside wall of the vertical members 142 by means of mounting plates 168 and 169. A foot plate 170 is pivotally mounted at 171 to the bottom end of the inner tubular member 167. A gear box 172 has a shaft 173 extending therein and operated by a foldable hand crank 174. The gear box 172 is of a type commonly known in the art which also includes a shaft 176 operable through suitable gears by rotation of the shaft 173 from which is also produced vertical movement of the inner tubular member 176 within the outer tubular member 166. The shaft 176 shown in FIGS. 10 and 11 extends across to the other side of the transporter to operate another jack assembly 165 similar to the one shown, such that turning of the hand crank 174 operates both jack stands 165 simultaneously. A bracket 180 is provided for storing the handle when not in use. With the jack stands shown in the position of FIG. 2, the front end of the transporter is supported for removal of the truck 23.

In FIGS. 19 and 20, there is shown another embodiment of the pivotal front section of the transporter 10. Instead of the gooseneck section 17, in this embodiment there is a front pivotal section 185 including members 186, 187, and 188 forming a triangle the base of which is near and parallel to the member 47 of the platform front section 21. The opposite vertex of the triangular frame is formed in an eyelet 189 for attachment to a truck. At opposite ends of the base member 186 are brackets 191 for pivotally connecting the trailer hitch unit 185 to the front platform section 21 as at 192. The brackets 191 are angled slightly as shown in FIG. 20 to allow the front end of the pivotal hitch assembly 185 to move downwardly when the hitch is pivoted. A cross member 193 spans between the members 187 and 188 forward of the member 146. A hydraulic cylinder 195 is connected between the member 146 and the member 193 by suitable brackets.

In this described embodiment the platform 14 is in its lowered position with the cylinder 195 retracted. By as the cylinder 195 is extended, the front end of the platform 14 is raised to cause the trailer hitch section 185 to pivot downwardly about the pin 192 relative to the platform 14. The hydraulic power supply 148 is mounted on top of the trailer hitch 185 as shown, and a jack stand 165 of the same type as that of the first described embodiment is suitably mounted to the cross member 193. It will be noted that in this described embodiment only one cylinder 195 and one jack stand 165 are shown although more can be used as requirements dictate.

OPERATION

The unique transporter design of this invention provides total adjustability of the platform to greatly facilitate loading transporting, and unloading of a module.

Preferably, it has been found best to operate the cylinders 157 together but independently of the cylinders 136. It has also been found desirable to operate the cylinders 136 of each of the bogie sections 115 and 116 together but independently of those of the other bogie section. The hydraulic jacks 90 may be operated together or separately as desired.

If it is desired to raise only one side of the platform 14 relative to the bogie assembly 16, for example in order to level the platform, such as where the transporter is sideways on a hill as shown in FIG. 8, the cylinders 136 on the side of the platform to be raised are extended the desired amount and the cylinders 136 on the side of the platform to remain lowered are retracted. These cylinders may be extended or retracted any desired amount. The tapered sides 132 of the guide blocks 130 give enough clearance between the bogie assembly 16 and the frame members of the platform 14 to allow for this side tilting. The king pin 152 within the fifth wheel of the truck 23 allows the front end of the transporter to tilt with the rear end. By extending or retracting all four of the cylinders 136 with equal pressure, the back end of the platform 14 can be either fully lowered as shown by the left half of FIG. 7 and right half of FIG. 4, or fully raised as shown in the right half of FIG. 7 and left half of FIG. 4, or can be placed in any position therebetween.

If the transporter 10 is facing either up or down a hill as shown in FIG. 5, and it is desired to level the platform 14, this can be accomplished by adjusting the height of either the front or rear of the platform. The height of the rear of the platform is adjusted with the cylinders 136 and the height of the front of the platform is adjusted with the cylinders 157 of the first described embodiment or cylinder 195 of the second described embodiment. Hence, by operation of the cylinders 136 and 157 or 195 the platform 14 can be made to tilt sideways in either direction, raised in the rear and lowered in the front, raised in the front and lowered in the rear, raised in both front and rear, lowered in both front and rear, or placed in various combinations of these positions within the extreme limits of the cylinders.

The tail section 20 and front section 21 of the platform 14 and the outriggers 60 are extensible in the manner heretofore described to accommodate modules of different sizes, and the jacks 90 are operable to lift the module off the platform 14 such as for the purpose of inserting apparatus therebetween for transferring the module onto a site foundation.

As can be seen, there has been described a transporter having a platform the height of which is totally adjustable for leveling the platform in spite of the unevenness of terrain on which the transporter rests which is extensible in both width and length to accommodate modules of various sizes, and which includes the other novel features heretofore described.

Various changes and modifications may be made in this invention, as will be readily apparent to those skilled in the art. Such changes and modifications are within the scope and teaching of this invention as defined by the claims appended hereto.

What is claimed is:

1. An adjustable transporter comprising a platform, a wheel bogie, means for supporting the rear end of the platform on the wheel bogie, said supporting means comprising sliding guide means restricting both transverse and longitudinal movement of the platform relative to the bogie and allowing movement of the platform relative to the wheel bogie in the generally vertical direction, and means for connecting the platform to the bogie, said connecting means providing generally vertical adjustment of the platform relative to the bogie in a selected manner and providing a rigid connection against vertical movement of the platform relative to the bogie for each selected position of vertical adjustment, the transporter further comprising means for connecting the front end of the transporter to a towing vehicle for towing the transporter.

2. The transporter of claim 1 further comprising a front section pivotally connected to the front of the platform for rotation about a transverse axis of the platform, the towing vehicle connecting means being located near the front of the pivotal section, and means connected between the pivotal section and platform for adjusting the vertical height of the front end of the platform relative to the ground.

3. The transporter of claim 2 wherein the means for connecting the platform to the bogie are hydraulic means.

4. The transporter of claim 3 wherein the pivotal section further comprises arms extending along the sides of the platform, the arms being pivotally connected to said sides for pivotal movement of the pivotal section about a transverse axis of the platform, the pivotal section having a raised portion higher than the front of the platform, and further comprising extensible actuating means connected between the raised portion of the pivotal section and the platform at a location on the platform spaced from the pivotal axis of the pivotal section.

5. The transporter of claim 3 wherein the pivotal section further comprises arms extending along the sides of the platform, the arms being pivotally connected to said sides for pivotal movement of the pivotal section about a transverse axis of the platform, the pivotal section having a portion below the front of the platform, and further comprising extensible actuating means being connected between the lower portion of the pivotal section and the platform at a location on the platform spaced from the pivotal axis of the pivotal section.

6. The transporter of claim 1 wherein the platform mounting means further comprises guide blocks mounted to the bogie, and vertical guide rails secured to the platform in close spaced relation to the guide blocks, the blocks moving vertically within the rails as the vertical height of the platform is adjusted, but closely restricting the transverse and longitudinal movement of the platform relative to the bogie.

7. The transporter of claim 6 wherein the side surfaces of the guide blocks taper inwardly toward their tops to provide relief to prevent interference between the bogie and platform where the platform is tilted about its longitudinal axes.

8. The transporter of claim 1 wherein the bogie connecting means are hydraulic cylinders and there is at least one of said cylinders at the front and rear ends of each side of the bogie, the cylinders on one side of the bogie being operable independently of the cylinders on the other side.

9. The transporter of claim 1 wherein the platform is extensible in the longitudinal direction.

10. The transporter of claim 1 wherein the platform is extensible in the transverse direction.

11. The transporter of claim 1 including jacks mounted about the perimeter of the platform and having a vertically adjustable support means for raising a load carried on the transporter off the platform.

12. The transporter of claim 1 including a jack stand at the front end of the transporter, the jack stand being adjustable to support the front end of the transporter in the absence of a towing vehicle.

13. The transporter of claim 1 wherein the platform and bogie are of tubular frame construction.

14. An adjustable transporter comprising a platform, a wheel bogie having a rigid frame structure suspended on a plurality of wheels, means for supporting the rear end of the platform on the wheel bogie, said supporting means comprising sliding guide means restricting both transverse and longitudinal movement of the platform relative to the bogie and allowing movement of the platform relative to the wheel bogie in the generally vertical direction, a plurality of extensible actuating means connecting the platform to the bogie, actuation of said extensible actuating means in a selected manner providing generally vertical adjustment of the platform relative to the bogie in a selected manner and providing a rigid connection against vertical movement of the platform relative to the bogie for each selected position of vertical adjustment, and means for connecting the front end of the transporter to a towing vehicle for towing the transporter.

15. The transporter of claim 14 wherein the platform mounting means further comprises guide blocks mounted to the bogie, and vertical guide rails secured to the platform in close space relation to the guide blocks, the blocks moving vertically within the rails as the vertical height of the platform is adjusted, but closely restricting the transverse and longitudinal movement of the platform relative to the bogie.

16. The transporter of claim 14 further comprising a front section pivotally connected to the front of the platform for rotation about a transverse axis of the platform, the towing vehicle connecting means being located near the front of the pivotal section, and means connected between the pivotal section and platform for adjusting the vertical height of the front end of the platform relative to the ground.

17. The transporter of claim 16 wherein the extensible actuating means are hydraulic cylinders at each side of the bogie, the cylinders on one side of the bogie being operable independently of the cylinders on the other side.

* * * * *